J. S. VAWTER.
COUPLING.
APPLICATION FILED DEC. 26, 1916.
1,260,734.
Patented Mar. 26, 1918.
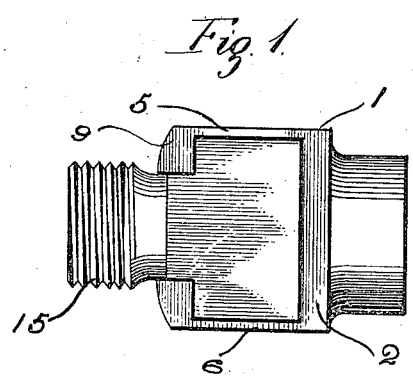
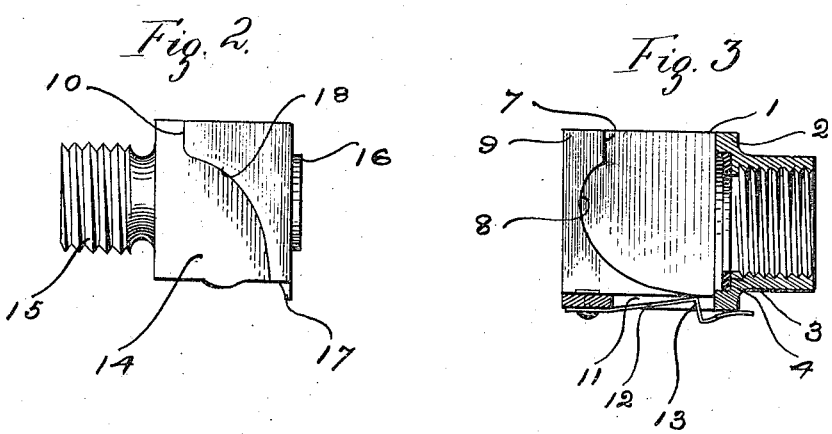
Witnesses:
Frank Newnham.
H. M. Barstow
Inventor:
Jamieson S. Vawter,
by [signature]
Atty.

UNITED STATES PATENT OFFICE.

JAMIESON S. VAWTER, OF LOS ANGELES, CALIFORNIA, ASSIGNOR TO J. WALTER SCOTT, OF PASADENA, CALIFORNIA.

COUPLING.

1,260,734. Specification of Letters Patent. Patented Mar. 26, 1918.

Application filed December 26, 1916. Serial No. 139,044.

*To all whom it may concern:*

Be it known that I, JAMIESON S. VAWTER, a citizen of the United States, residing at Los Angeles, county of Los Angeles, and State of California, have invented a certain new and useful Improvement in Couplings, of which the following is a specification.

My invention relates to a coupling and has for its objects to provide a simple device in which the joining of fluid conducting hose or pipes may be quickly and securely effected without employing tools or skill; in which the fluid may be conducted without leakage, and to provide a self-locking and readily dissociable coupling.

Other objects will appear from the subjoined description in connection with the accompanying drawing, in which, Figure 1 is a top plan view showing my invention as assembled.

Fig. 2 is a side elevation of one part of the coupling and Fig. 3 is a sectional view of the other part of the coupling.

The invention comprises a substantially rectangular hollow member 1, open at one end and arranged for engagement with a water service pipe or other connection, not shown. In a wall 2 of said member is an interior annular seat 3, supporting a gasket 4.

Two oppositely disposed sides or walls 5 and 6 of said member are each provided with a segmental curved surface 8, extending inwardly from and at right angles to the plane of said walls. The end wall 9, is provided with a cut-out portion and the bottom of said hollow member 1, is provided with an opening 11, into which extends normally a spring or other yielding means 12, shaped, preferably as shown, to provide a ledge or abutment 13, and having its end terminating beyond the wall 2, whereby to afford a purchase of the thumb or other member in operating said yielding member.

Arranged to fit within said hollow member 1, is a substantially rectangular member 14, having a central longitudinal bore and on one end a threaded hose connection 15. At the other end, the member 14 is provided with an annular extension 16, arranged to be forced against the gasket 4, on the seat 3, of said hollow member, to form a seal between said hollow member and said rectangular member and prevent leakage.

Each side of said rectangular member 14, is provided with a segmental curved surface 18 extending substantially from and at right angles to the plane of the member.

When the two members are coupled, the upper vertical edges 10 of said rectangular member abut against the upper vertical edges 7 of said hollow member.

During the operation of inserting the rectangular member 14 in the hollow member, the extension 16 thereof, by reason of the surfaces 8, is forced against the gasket 4, and, when in proper position, the member 14 is held against displacement and dislodgment from said hollow member by any suitable means, which automatically operates, as presently described.

The member 14, is formed with a downwardly extending tang 17, which during the assembly of the coupling units, operates over said yielding means 12, and eventually lodges behind the ledge or abutment thereof, whereby the units are locked together.

This tang 17, is preferably of the width of the opening 11 in the bottom of said hollow member.

What I claim, is:—

A coupling comprising a hollow member arranged for attachment to a water service pipe, and open at one end, each side wall of said member formed with inwardly extending segmental curved surfaces and the bottom provided with an opening; a yielding means fastened to said hollow member and normally extending in said opening, said means bent upon itself to form a ledge; and a rectangular member formed with outwardly extending curved surfaces and with a tang for engagement with said ledge, to hold said members interlocked, and a gasket between said members.

In testimony whereof I have set my hand in the presence of two witnesses.

JAMIESON S. VAWTER.

Witnesses:
HENRY E. STORRS,
FRANK NEWNHAM.